United States Patent
Dittenhofer

(10) Patent No.: US 7,533,610 B2
(45) Date of Patent: May 19, 2009

(54) DIRECT DRIVE FOR A PRINTING-PRESS CYLINDER

(75) Inventor: Thomas Dittenhofer, Riedbach (DE)

(73) Assignee: Ina-Schaeffler-KG, Herzogenaurach (DE)

( * ) Notice: Subject to any disclaimer, the term of this patent is extended or adjusted under 35 U.S.C. 154(b) by 534 days.

(21) Appl. No.: 10/560,369

(22) PCT Filed: Jun. 8, 2004

(86) PCT No.: PCT/EP2004/006143

§ 371 (c)(1),
(2), (4) Date: Dec. 9, 2005

(87) PCT Pub. No.: WO2004/110760

PCT Pub. Date: Dec. 23, 2004

(65) Prior Publication Data

US 2006/0272523 A1 Dec. 7, 2006

(30) Foreign Application Priority Data

Jun. 17, 2003 (DE) ................... 103 27 218

(51) Int. Cl.
B41F 13/008 (2006.01)
(52) U.S. Cl. ............ 101/480; 101/216; 310/40 R
(58) Field of Classification Search .......... 101/216, 101/375, 151, 480; 318/625, 572, 574; 310/40 R, 310/90
See application file for complete search history.

(56) References Cited

U.S. PATENT DOCUMENTS

| | | | | |
|---|---|---|---|---|
| 5,656,909 A | * | 8/1997 | Gotz et al. ............ | 318/625 |
| 5,771,805 A | * | 6/1998 | Branas et al. ............ | 101/248 |
| 5,953,991 A | * | 9/1999 | Geissenberger et al. ..... | 101/218 |
| 6,178,884 B1 | * | 1/2001 | Weschenfelder .......... | 101/247 |
| 6,247,407 B1 | | 6/2001 | Hartman et al. | |
| 6,408,748 B1 | * | 6/2002 | Hajek et al. ............ | 101/177 |
| 2003/0167942 A1 | * | 9/2003 | Kobayashi et al. ......... | 101/216 |

FOREIGN PATENT DOCUMENTS

| | | |
|---|---|---|
| DE | 41 10643 A1 | 10/1992 |
| DE | 41 38 479 A1 | 6/1993 |
| DE | 43 22 744 C2 | 8/1998 |
| DE | 195 30 283 A1 | 10/1998 |
| DE | 197 16 943 A1 | 11/1998 |
| DE | 19958 545 C1 | 4/2001 |
| EP | 1 277 575 A1 | 1/2003 |

* cited by examiner

Primary Examiner—Leslie J Evanisko

(57) ABSTRACT

The invention relates to an electromotive direct drive for one cylinder (1) of a printing press, which cylinder (1) is held in a connecting construction (3) with a journal (2) via a roller bearing (4), a rotor (6.1) of an electric motor (6) being connected fixedly in terms of rotation to the journal (2), and a stator (6.2) being connected to the connecting construction (3).

This drive is distinguished by the fact that the rotor (6.1) is connected to an end side of the roller bearing (4), and the stator (6.2) is accommodated by a housing (9) which can be fastened to the connecting construction (3) via a bearing housing (5).

The advantage of this direct drive according to the invention lies in the fact that the drive and the bearing are combined as a captive, preassembled structural unit which can be handled in a simple manner.

10 Claims, 2 Drawing Sheets

DIRECT DRIVE FOR A PRINTING-PRESS CYLINDER

FIELD OF THE INVENTION

The invention relates to an electromotive direct drive for one cylinder of a printing press, which cylinder is held in a connecting construction with a journal via a roller bearing, a rotor of an electric motor being connected fixedly in terms of rotation to the journal, and a stator being connected to the connecting construction.

BACKGROUND OF THE INVENTION

In the past, printing units of printing presses have been driven by a main drive which distributes its drive power to the individual units of a printing press via a mechanical line shaft. The printing units are connected and coupled to one another by said mechanical line shaft in such a way that their synchronized running with respect to one another is also possible. In order to realize this, however, a complex mechanical system is necessary with a large number of different components such as gear mechanisms and clutches. The weak points which result from this, such as transmission errors on account of yielding of mechanical transmission members, play, elasticity and additional large inertial masses, impair the printed image, however.

Attempts have been made to eliminate this deficiency by a separate, electromotive drive being assigned to every printing unit or its cylinder. A separate printing drive of this type, which is also called a direct drive, for one cylinder of a printing press is already known from DE 41 38 479 C3. Said drive makes it possible that a drive train which is free of play, low in inertial mass and mechanically rigid can be constructed for every cylinder or every roll of a printing unit. The masses which are to be moved are connected rigidly and fixedly to the rotor of the driving electric motor directly, with the preclusion of elasticity, yielding and play, the associated stator likewise being connected to a stationary wall, for example a printing press wall, in a manner which is free of elasticity and play. As can be gathered from FIG. 7 of this prior publication, a cylinder of a printing unit is provided at one end side with a journal of reduced diameter. At its end which faces the cylinder, said journal is held by a roller bearing. A rotor of an electric motor is pushed onto the journal in a manner which is spaced apart from said roller bearing, the associated stator of said electric motor being held by an adjustment wall of the printing press. A disadvantage of this arrangement is that it requires relatively high expenditure on assembly, because the bearing which holds the journal and the driving electric motor do not form a unit which is ready for installation.

This form of direct drive is also known from EP 1 277 575 A1. As shown by the associated FIGS. 31, 32 and 33 of this prior publication, the journal of a cylinder of a printing press is held in a housing via a bearing point. In turn, this bearing point is adjoined by an electric motor, the rotor of which is pushed onto the journal and the stator of which is accommodated by a housing which is connected to a frame wall. The abovedescribed disadvantages are also apparent here, that is to say the electric motor of the direct drive and the associated bearing of the journal do not form a unit which is ready for installation.

SUMMARY OF THE INVENTION

Proceeding from the disadvantages of the prior art, the invention is based on the object of developing an electromotive direct drive for cylinders of a printing press in such a way that said direct drive is configured for handling which is amenable to assembly, that is to say easy.

According to the invention, this object is achieved by the rotor being connected to an end side of the roller bearing, and the stator being accommodated by a housing which can be fastened to the connecting construction via a bearing housing.

The decisive advantage of the direct drive which is configured according to the invention lies in the fact that a captive structural unit which combines the electric motor and the bearing is formed, which structural unit can be attached by the end user in a simple manner merely by fastening it into its connecting construction. This is advantageous, in particular, as the rotor and the stator of the electric motor cannot change their operating position with respect to one another as a result of the configuration according to the invention, because they are connected fixedly to other constituent parts of the structural unit. This is of significance as great forces can occur between the two on account of permanent magnets. The other advantages which are known per se of a direct drive for driving one cylinder of a printing press are preserved. Therefore, a drive train which is free of play, low in inertial mass and mechanically rigid can be constructed for every cylinder or for every press roll, which drive train is additionally combined to form a captive structural unit. In this way, the printing quality can be improved, as the masses which are to be moved are connected rigidly and fixedly to the rotor of the driving electric motor directly, with the preclusion of elasticity, yielding and play. There is no need at this point to address further advantages of direct drives in printing presses, as they are known to the person skilled in the art and are also shown in detail, for example, in DE 41 38 479 C3.

Further advantageous refinements of the invention are described below.

In one development of the invention, there is provision for the bearing housing to be held concentrically by a an accommodation hole of the connecting construction. This has the advantage that installation space can thus be saved in the axial direction.

According to a further additional feature, the rotor is to cover an end side of the journal at least partially in the radially inward direction. It is ensured in this way that the structural unit which comprises the electric motor and the bearing can be fastened to the journal of the cylinder in a simple manner.

According to a further additional feature, the roller bearing is to be configured as a cylindrical roller bearing, a tapered roller bearing or an angular contact ball bearing.

There is provision for an outer raceway of the roller bearing to be formed by an outer ring or by the bearing housing itself. In the latter case, the structural unit is reduced by one constituent part, with the result that said structural unit is designed even more simply.

It is apparent that the outer raceway of the roller bearing is offset eccentrically with respect to an axis of the receptacle hole of the connecting construction. It is possible in this way for the rotational axis of the cylinder to be adjustable, in that the outer raceway of the roller bearing can be deflected eccentrically within the connecting construction. The cylinder can thus be adjusted or positioned with respect to a further cylinder by rotation of the complete unit.

In one advantageous development of the invention, a measuring apparatus for determining the rotational angle of the cylinder is to be arranged on said cylinder for achieving synchronism with other cylinders of the printing press. In the context of the invention, this is to be understood as a fixed direct connection between the cylinder and the measuring apparatus, which connection avoids measuring errors of previous systems which are connected to the cylinder via coupling elements.

It is apparent that a sensor is arranged in the bearing housing, which sensor is operatively connected to an encoded measuring ring which is arranged on the journal of the cylinder, the sensor signals which are detected being supplied to a control device for adjusting advanced or retarded running.

In this way, precise synchronism of a plurality of cylinders of a printing press can be achieved, as corrections to the advanced or retarded running of individual cylinders can be performed by the control device in a simple manner. Regulating systems of this type in the printing industry are already known per se and have already been described, for example, in DE 43 22 744 C2, DE 197 14 402 A1, DE 197 16 943 A1 and DE 197 54 323 A1. In the context of the invention, the advantage lies in the fact that this regulating device which is known per se for setting the synchronism of a plurality of cylinders is an inherent constituent part of the structural unit according to the invention.

Finally, there is provision for the measuring ring to be a separate component or to be formed by an axial extension of an inner ring of the roller bearing.

The invention will be described in greater detail using the following exemplary embodiment.

DETAILED DESCRIPTION OF THE DRAWINGS

Figure 1:
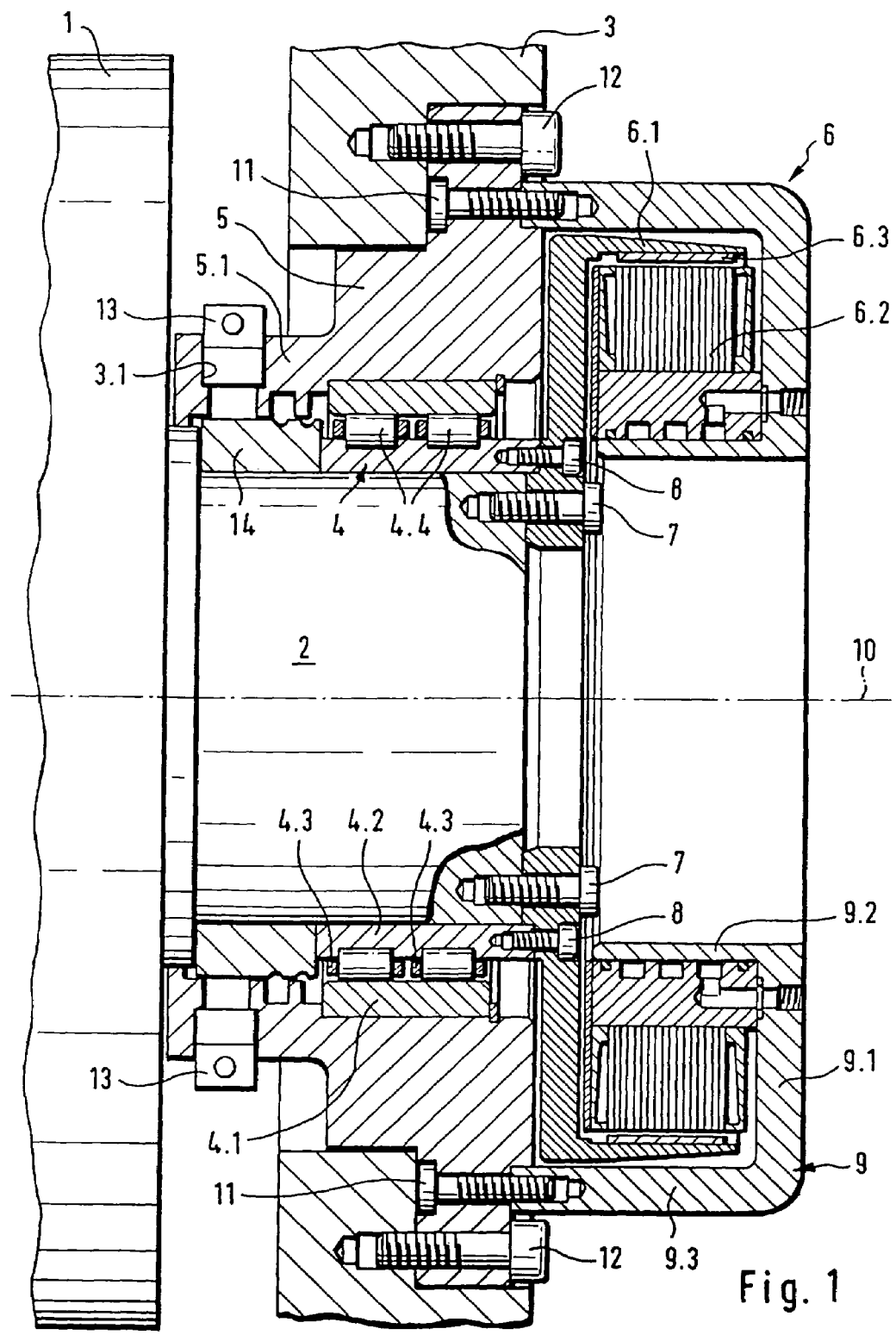
FIG. 1 shows a longitudinal section through a direct drive according to the invention of one cylinder of a printing press.
Figure 2:
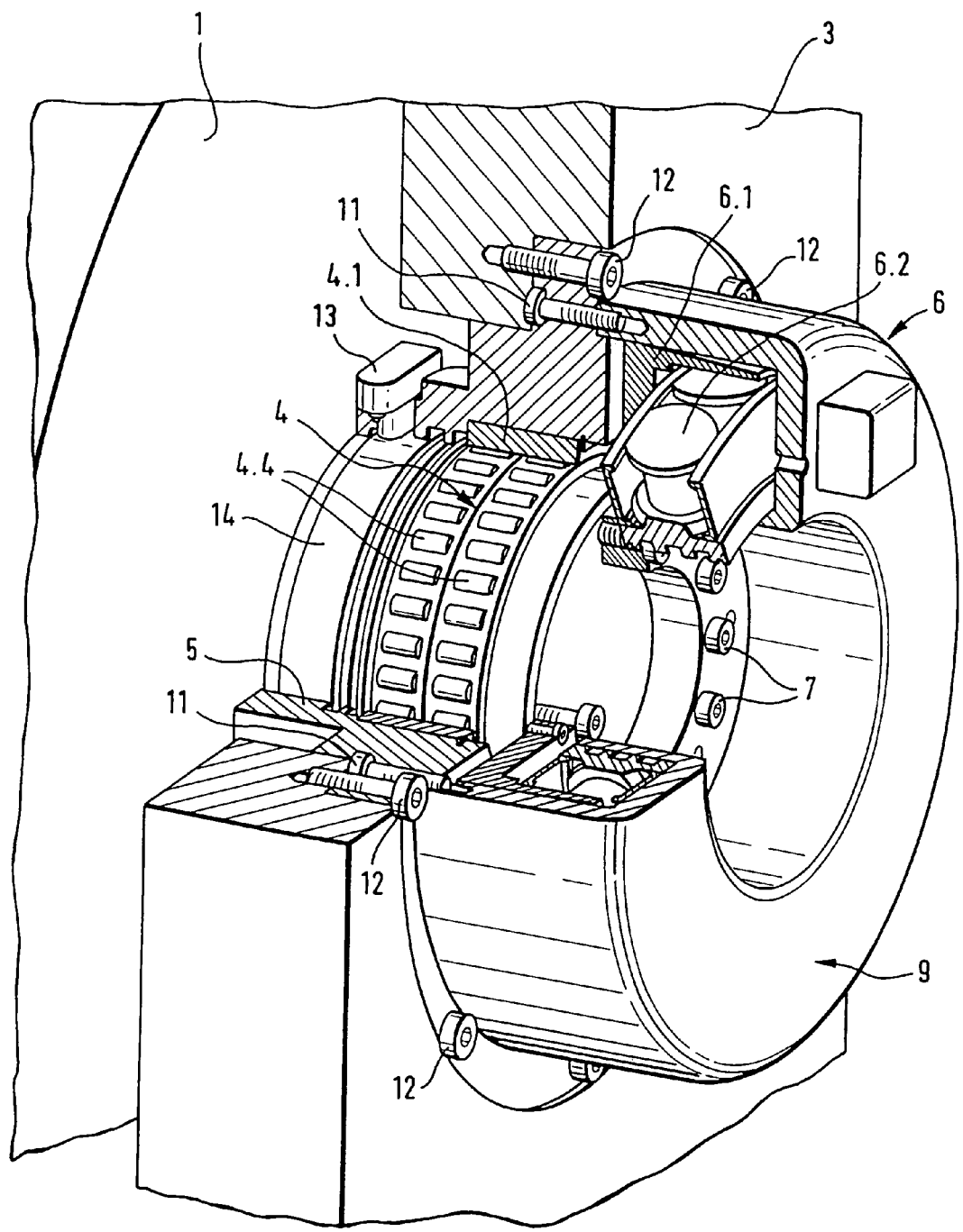
FIG. 2 shows a perspective illustration of the direct drive according to FIG. 1, in a partially sectioned view.

The electromotive direct drive which is shown in FIGS. 1 and 2 for a printing press exhibits a cylinder 1 which is continued at one end by a journal 2 of reduced diameter. Said journal 2 is held via a roller bearing 4 in a connecting construction 3, for example a frame wall. Said roller bearing 4 is configured as a double-row floating cylindrical roller bearing which is pretensioned without play, and has an outer ring 4.1 and an inner ring 4.2, between which cylindrical rollers 4.4 which are guided in cages 4.3 roll on associated raceways. The bearing 4 is held concentrically by a bearing housing 5, the bearing housing 5 in turn being held concentrically by the receptacle hole 3.1 of connecting construction 3.

A further part of the direct drive is an electric motor 6, the bowl-like rotor 6.1 of which covers the end side of the journal 2 partially in the radial direction and is fixed to said end side with the aid of fastening screws 7. At the same time, the rotor 6.1 is connected via further fastening screws 8 to the end side of the inner ring 4.2 of the roller bearing 4. The stator 6.2 is accommodated by a housing 9, the base 9.1 of said housing 9, which extends in the radial direction, being continued by an inner and an outer flange 9.2, 9.3 which extend in the direction of the axis 10. The stator 6.2 is fitted fixedly in terms of rotation to the inner flange 9.2 of the housing 9 in any desired manner. The housing 9 is connected via fastening screws 11 to the bearing housing 5, the latter in turn being surrounded concentrically by the connecting construction 3 and being connected fixedly to the latter via further fastening screws 12.

In this way, a structural unit is formed which comprises the roller bearing 4, the bearing housing 5, the rotor 6.1, the stator 6.2 and the housing 9, and which is held together by the fastening screws 8 and 11. This has the advantage that the rotor 6.1 and the stator 6.2 cannot change their position with respect to one another, that is to say the air gap 6.3 which is formed between the two is always constant. The assembled structural unit which is stable and adapted to the requirements of a printing press manufacturer is delivered to the latter, who need only introduce it into his construction in a simple manner with the aid of fastening screws 7 and 12.

As can be seen further from the abovementioned figures, a measuring system is also part of the direct drive, it being possible to sense the rotational angles of the cylinder 1 with the aid of said measuring system. Said measuring system comprises a sensor 13 which is operatively connected to an encoded measuring ring 14. The sensor 13 is held by a receptacle hole of an extension 5.1 of the bearing housing 5 and is arranged spaced apart in the radial direction from the measuring ring 14, the latter being positioned on the journal 2 next to the bearing inner ring 4.2. The encoding marks of the measuring ring 14, which are spaced apart from one another uniformly in the circumferential direction, are scanned by the sensor 13, and the sensor signals are supplied to a control device, for example a microcomputer, which determines the corresponding rotational angles of the cylinder 1. Said rotational angles of the cylinder 1 are then compared with rotational angles of other cylinders of the printing press and corrected in such a way that the rotational speed is maintained, increased or decreased. In this way, synchronous running of a plurality of cylinders of a printing press can be realized in a simple manner. The advantage of this measuring arrangement lies in the fact that it is an inherent constituent part of the assembled direct drive unit. Complicated measuring arrangements which have to be attached from outside can therefore be dispensed with. Possible sources of faults are also precluded by the integration of the measuring arrangement into the direct drive unit.

LIST OF DESIGNATIONS

1 Cylinder
2 Journal
3 Connecting construction
3.1 Accommodation hole
4 Roller bearing
4.1 Outer ring
4.2 Inner ring
4.3 Cage
4.4 Cylindrical roller
5 Bearing housing
5.1 Extension
6 Electric motor
6.1 Rotor
6.2 Stator
6.3 Air gap
7 Fastening screw
8 Fastening screw
9 Housing
9.1 Base
9.2 Inner flange
9.3 Outer flange
10 Axis
11 Fastening screw
12 Fastening screw
13 Sensor
14 Measuring ring

The invention claimed is:

1. An electromotive drive for a printing press cylinder having a journal and supported in a printing press housing, comprising:
    an electric motor having a stator and a rotor;
    a motor housing for containing the electric motor;
    a roller bearing having an end face, wherein the roller bearing is configured to be fitted over the journal and to support the journal within the printing press housing;
    a bearing housing for containing the roller bearing and being configured to be affixed to the printing press housing;
    wherein the roller bearing, rotor, stator, and motor housing are provided as a single unit that can be fitted to the journal so that most of the rotor does not extend axially along the journal; the stator being configured to be fixedly attached to the printing press housing, and the rotor fixedly attached to and extending beyond the end face of the roller bearing.

2. The direct drive as claimed in claim 1, wherein the rotor extends at least partially radially over an end face of the journal.

3. The direct drive as claimed in claim 1, wherein the roller bearing is a cylindrical roller bearing.

4. The direct drive as claimed in claim 1, wherein the roller bearing has an outer raceway that is formed by an outer ring or by the bearing housing.

5. The direct drive as claimed in claim 4, wherein the outer raceway of the roller bearing is offset eccentrically with respect to an axis of a receptacle hole of located within the printing press housing.

6. The direct drive as claimed in claim 1, further comprising a measuring apparatus that is arranged on the cylinder for determining the rotational angle of the cylinder for enabling its synchronous operation with at least one other printing press cylinder.

7. The direct drive as claimed in claim 1, further comprising a sensor arranged in the bearing housing and an encoded measuring ring that is configured to be arranged on the journal, said sensor being operatively connected to the encoded measuring ring, the sensor detecting signals which are used for adjusting the speed of operation of the cylinder.

8. The direct drive as claimed in claim 7, wherein the measuring ring is formed as a separate component.

9. The direct drive as claimed in claim 7, wherein the measuring ring is part of an axial extension of an inner ring of the roller bearing.

10. A modular cassette for providing electromotive drive to a printing press cylinder that is located within a printing press housing, the cylinder being supported by a journal, the modular cassette comprising:
    an electric motor having a stator and a rotor, with a fixed air gap therebetween;
    a motor housing for containing the electric motor;
    a roller bearing having an end face, wherein the roller bearing is configured to be fitted over the journal and to support the journal;
    a bearing housing for containing the roller bearing and being configured to be affixed to the housing of the printing press;
    wherein the roller bearing, rotor, stator, and motor housing are a single unit that can be fitted to the journal so that when the single unit is attached to a printing press, the stator is fixedly attached to the printing press housing, and the rotor fixedly attached to and axially extends beyond the end face of the roller bearing and does not extend axially along the journal.

* * * * *